Dec. 7, 1948.  W. L. WEEKS  2,455,717
AUTOMATICALLY SUBMERGED SUMP PUMP
Filed Oct. 9, 1946
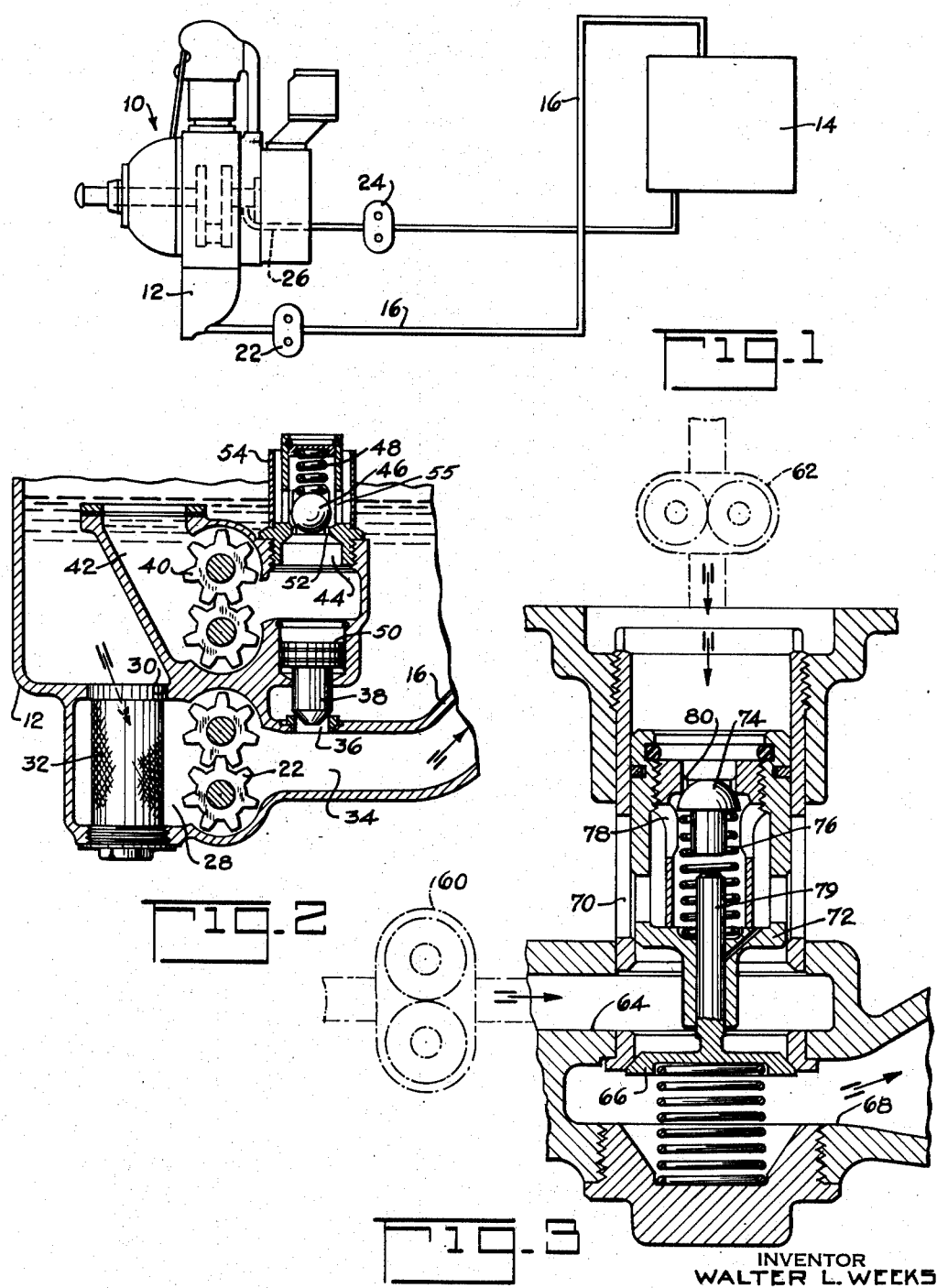
INVENTOR
WALTER L. WEEKS
BY
ATTORNEY Patented Dec. 7, 1948

2,455,717

UNITED STATES PATENT OFFICE 2,455,717

AUTOMATICALLY SUBMERGED SUMP PUMP

Walter L. Weeks, Wyckoff, N. J., assignor to Wright Aeronautical Corporation, a corporation of New York Application October 9, 1946, Serial No. 702,246

11 Claims. (Cl. 103—11)

This invention relates to scavenge pumps and is particularly directed to the provision of means for automatically maintaining a scavenge pump submerged in the liquid to be scavenged.

Aircraft engines are generally provided with a so-called dry-sump lubrication system. In such a lubrication system, oil is stored in a reservoir from which it is pumped to the various engine bearing surfaces by an engine driven pump. The oil drains from these bearing surfaces into a sump from which it is returned to the reservoir by an engine driven scavenge pump. In order to insure removal of substantially all the oil from the engine sump under all engine operating conditions, the scavenge pump is provided with a capacity more than sufficient for returning all the oil from the sump to the reservoir under the most adverse pump operating conditions. This excess capacity of the scavenge pump is essential in order to prevent oil from overflowing the sump. Because of this excess capacity, during normal operation, the scavenge pump returns a substantial amount of air or other gases with the oil back to the reservoir. The air and other gases become entrained within the oil and are only partially separated therefrom in the reservoir. This mixture of oil and gases is delivered from the reservoir to the engine lubricating oil pump thereby reducing the quantity of oil delivered to the various engine bearing surfaces by the last-mentioned pump.

An object of this invention is to provide means for maintaining the scavenge pump submerged in spite of its excess capacity. To this end, a relief valve is provided which by passes oil back from the scavenge pump into the sump for recirculation through the scavenge pump whenever the oil level within the sump falls below a predetermined value. With this arrangement, little or no gases are returned to the oil supply reservoir by the scavenge pump.

Other objects of the invention will become apparent upon reading the annexed detailed description in connection with the drawing in which:

Figure 1 is a diagrammatic view of an engine dry-sump lubrication system;

Figure 2 is a sectional view of a portion of Figure 1 embodying the invention; and Figure 3 is a sectional view of a modified form of the invention.

Referring first to Figure 1, a conventional radial cylinder engine, schematically indicated at 10, is provided with a sump 12 into which the oil drains from the various engine bearing surfaces. From the sump 12, the oil is returned to an oil supply reservoir 14 through passage 16 by means of an engine driven scavenge pump 22. A second engine driven pump 24 draws oil from the reservoir 14 and supplies the oil under pressure to the various bearing surfaces of the engine through passages such as 26. The system so far described is quite conventional.

Referring now to Figure 2, the scavenge pump 22 is placed in the bottom of the sump 12 into which engine lubricating oil drains from the various engine bearing surfaces. The oil drains down to the inlet side 28 of the scavenge pump 22 through an opening 30 and an oil filter 32. The outlet side 34 of the scavenge pump communicates with the passage 16 through which oil is returned by the scavenge pump to the supply reservoir 14.

A by pass or relief port 36 communicates with the outlet side 34 of the scavenge pump and a valve 38 controls this port. When the bypass valve 38 is open, the scavenge pump 22 returns oil back to the sump 12 through the port 36 for recirculation through scavenge pump 22. That is, the valve 38 controls a by-pass passage extending around the pump from its outlet side 34 to its inlet side 28 of the scavenge pump 22. The by-pass valve 36 is controlled by an engine driven pump 40, the output pressure of which urges the by-pass valve 38 to its closed position. The control pump 40 is also disposed in the sump 12 and the inlet side of the control pump 40 communicates with the sump through a passage 42. The control pump 40 draws oil from the sump 12 through the passage 42 and pumps the oil back into the sump through a passage 44 controlled by a pressure relief valve 46. The valve 46 is urged to its closed position against the output pressure of the pump 40 by a spring 48 thereby determining the output pressure of the control pump 40. The output pressure of the pump 40 acts against the upper end 50 of the by-pass valve 38 to urge the valve 38 to its closed position.

The construction is such that, when the level of the oil in the sump 12 is above the inlet of the passage 42, the output pressure of the control pump 40 acting against the end 50 of the valve 38 is sufficient to hold the valve 38 closed against the output pressure of the scavenge pump 22. Under these conditions, the scavenge pump 22 returns oil to the reservoir 14 in the normal manner and, because of the excess capacity of the scavenge pump, the level of oil in the sump 12, falls. When the level of the oil within the sump falls below the inlet to the passage 42, the output pressure of the pump 40 falls off whereupon the output pressure of the scavenge pump 22 is sufficient to raise and open the by-pass valve 38. As a result, a substantial quantity of oil is returned directly to the sump by the scavenge pump 22 through the by-pass passage 36, thereby reducing the net rate at which the scavenge pump returns oil from the sump to the oil supply reservoir 14. The arrangement is such that the valve 38 opens to an extent that the pump 40 remains partially primed. Thus, any increase in quantity of oil in the sump 12 results in an increase in the output pressure of the control pump 40 thereby effecting a closing adjustment of the by-pass valve 38 whereupon the rate at which the scavenge pump 22 removes oil from the sump to the supply reservoir 14 is increased. Similarly, a decrease in the level of the oil in the sump below the inlet to the passage 42 results in a decrease in the output pressure of the control pump 40, thereby effecting an opening movement of the valve 38 and decreasing the rate at which the scavenge pump removes oil from the sump to the supply reservoir 14.

With this construction, the level of oil in the sump remains substantially at the inlet to the passage 42 and, since this level is above the top of the scavenge pump 22 and its inlet to the sump 12, the scavenge pump remains submerged in oil in spite of its excess capacity. Accordingly, only the gases mixed with the oil at the inlet of the scavenge pump are returned to the reservoir 14 by the scavenge pump.

Slots 52 are provided in the seat for the valve 46 to permit the escape of gases therethrough. In the absence of passages permitting the escape of gases delivered by the control pump 40, when the level of the oil within the sump falls below the inlet to the passage 42, the control pump may provide a sufficient output gas pressure to hold the by-pass valve 38 closed.

As illustrated, the pump 40 preferably discharges oil into the sump 12 through a stand pipe 54 which extends above the normal level of oil within the sump. In this way, gases delivered by the pump 40 are not mixed with the oil in the sump 12. Also, the capacity of the control pump 40 preferably is considerably less than the capacity of the scavenge pump 22.

At low temperatures, the resistance offered by the passage 16 to oil flow therethrough is greater than at higher oil temperatures and, therefore, the discharge pressure of the scavenge pump 22 is higher at low oil temperatures. In order to balance the increase valve opening pressure on the by-pass valve 38 at low oil temperatures, the pressure relief valve 46 may be designed to provide a higher control pump output pressure at low oil temperatures. For example, a thermostat may be provided to help urge the valve 46 toward its closed position at low oil temperatures, or the discharge openings 55 may be made sufficiently small so that the increased resistance to oil flow therethrough at low temperatures results in an increase in the output pressure of the control pump 40 corresponding to the increase in the output pressure of the scavenge pump 22.

Figure 3 illustrates a modified arrangement of the relief and by-pass valves together with a check valve in the return passage of the scavenge oil to the oil supply reservoir. In Figure 3, a scavenge pump 60 and a control pump 62 are disposed within the engine sump with the inlet to the control pump disposed above the scavenge pump and its inlet as in Figure 2.

The scavenge pump 60 discharges oil into an outlet passage 64 and thence past a check valve 66 to a passage 68 communicating with the oil supply reservoir. The check valve 66 prevents return of oil from the reservoir back into the engine sump through the scavenge pump 60 while the engine is shut down. The scavenge pump 60 can return oil directly to the sump through a by-pass passage 70 when a valve 72 is open. As in Figure 1, the by-pass valve 72 is urged to its closed position by the output pressure of the control pump 62 and a spring urged pressure relief valve 74 is provided for controlling the output pressure of the control pump 62. The output oil pressure of the control pump 62 opens relief valve 74 against its spring 76 and the control pump returns the oil to the sump through opening 78 in the body of the valve 72 and through the passage 70. Also, the seat for the relief valve 74 has small openings 80 for the escape of gases therethrough as in the modification of Figure 2.

As illustrated, the relief valve 74 and its spring 76 are disposed within the body of the by-pass valve 72 and, in addition, the stem 79 has a sliding fit within the body of the by-pass valve, thereby providing a compact valve arrangement. The operation of the by-pass control valves 72 and 74 is essentially the same as the operation of the corresponding by-pass and control valves 38 and 46 of Figure 2.

With both aforedescribed modifications, the scavenge pump remains submerged in oil in spite of its excess capacity so that little or no gases are returned to the oil reservoir by the scavenge pump. Although the invention has been described in connection with the dry-sump lubrication system of an engine, it should be apparent that the invention is of general application. Thus, the invention may be used wherever it is desired to keep a scavenge pump submerged in the liquid to be scavenged thereby.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination, a sump into which a liquid is arranged to drain, a pump operable to remove liquid from said sump, a passage establishing communication between the outlet and inlet sides of said pump, a valve arranged to control said passage, said valve being urged in an opening direction by the output pressure of said pump, and means operable to hold said valve closed against said pump pressure only when the level of the liquid is above said pump to a predetermined extent.

2. In combination, a sump into which a liquid is arranged to drain, a first pump having its inlet side communicating with said sump and operable to remove liquid from said sump, a passage establishing communication between the outlet and inlet sides of said pump, a valve arranged to control said passage, and a second pump having its inlet communicating with said sump at a level above said first pump, the output pressure of said second pump being effective to urge said valve to its closed position.

3. In combination, a sump into which a liquid is arranged to drain, a first pump having its inlet side communicating with said sump and operable to remove liquid from said sump, a passage establishing communication between the outlet and inlet sides of said pump, a valve arranged to control said passage, a second pump having its inlet communicating with said sump at a level above said first pump, the output pressure of said second pump being effective to urge said valve to its closed position, and a pressure relief valve through which said second pump returns liquid to said sump.

4. In combination, a sump into which a liquid is arranged to drain, a first pump having its inlet side communicating with said sump and operable to remove liquid from said sump, a passage establishing communication between the outlet and inlet sides of said pump, a valve arranged to control said passage, a second pump having its inlet communicating with said sump at a level above said first pump, the output pressure of said second pump being effective to urge said valve to its closed position, and a pressure relief valve through which said second pump returns liquid to said sump, said pressure relief valve being movable with and relative to said first-mentioned valve.

5. In combination, a sump into which a liquid is arranged to drain, a first pump having its inlet side communicating with said sump and operable to remove liquid from said sump, a passage establishing communication between the outlet and inlet sides of said pump, a valve arranged to control said passage, a second pump having its inlet communicating with said sump at a level above said first pump, the output pressure of said second pump being effective to urge said valve to its closed position, and a pressure relief valve through which said second pump returns liquid to said sump, said pressure relief valve cooperating with a seat formed on said first-mentioned valve.

6. In combination, a sump into which a liquid is arranged to drain, a first pump having its inlet side communicating with said sump and operable to remove liquid from said sump, a passage establishing communication between the discharge side of said pump and said sump, a valve arranged to control said passage, said valve being urged in an opening direction by the output pressure of said pump, a second pump having its inlet communicating with said sump at a level above said first pump, the output pressure of said second pump being effective to urge said valve toward its closed position.

7. An engine lubrication system comprising an oil supply reservoir, a sump into which oil is arranged to drain from the engine bearing surfaces, an engine driven scavenge pump operable for removing oil from said sump to said reservoir, means providing a passage which when open establishes communication between the discharge side of said pump and said sump, a valve arranged to control said passage, and means for urging said valve to its passage closing position when the oil level in said sump exceeds a predetermined value.

8. An engine lubrication system comprising an oil supply reservoir, a sump into which oil is arranged to drain from the engine bearing surfaces, an engine driven scavenge pump having an inlet passage communicating with said sump and operable to remove oil from said sump to said reservoir, a second passage which, when open, establishes communication between the discharge side of said pump and said sump, a valve arranged to control said passage, and a second pump having its inlet communicating with said sump at a level above said first scavenge pump, the output pressure of said second pump being effective to urge said valve toward its closed position.

9. An engine lubrication system comprising an oil supply reservoir, a sump into which oil is arranged to drain from the engine bearing surfaces, an engine driven scavenge pump having an inlet passage communicating with said sump and operable to remove oil from said sump to said reservoir, a second passage which, when open, establishes communication between the discharge side of said pump and said sump, a valve arranged to control said passage, a second pump having its inlet communicating with said sump at a level above said first scavenge pump, the output pressure of said second pump being effective to urge said valve toward its closed position, and a pressure relief valve through which said second pump returns liquid to said sump.

10. An engine lubrication system comprising an oil supply reservoir, a sump into which oil is arranged to drain from the engine bearing surfaces, an engine driven scavenge pump having an inlet passage communicating with said sump and operable to remove oil from said sump to said reservoir, a second passage which, when open, establishes communication between the discharge side of said pump and said sump, a valve arranged to control said passage, a second pump having its inlet communicating with said sump at a level above said first scavenge pump, the output pressure of said second pump being effective to urge said valve toward its closed position against the output pressure of said scavenge pump.

11. In combination, a sump into which a liquid is arranged to drain, a first pump having its inlet side communicating with said sump and operable to remove liquid from said sump, a passageway establishing communication between the inlet and outlet sides of said pump, a valve arranged to control said passageway, said valve being urged in an opening direction by the output pressure of said pump, and a second pump, said second pump having its inlet side communicating with said sump at a level above said first pump, the output pressure of said second pump being effective to urge said valve toward its closed position.

WALTER L. WEEKS.

REFERENCES CITED

The following references are of record in the file of this patent:

UNITED STATES PATENTS

| Number | Name | Date |
| --- | --- | --- |
| 1,477,850 | Pool | Dec. 18, 1923 |
| 2,305,971 | Livingston et al. | Dec. 22, 1942 |